April 16, 1935.  W. J. ALBERSHEIM  1,998,064
SOUND FILM RECORDING SYSTEM
Filed Sept. 30, 1932   2 Sheets-Sheet 1

INVENTOR
W. J. ALBERSHEIM
BY
G. H. Heydt.
ATTORNEY

April 16, 1935.    W. J. ALBERSHEIM    1,998,064
SOUND FILM RECORDING SYSTEM
Filed Sept. 30, 1932    2 Sheets-Sheet 2

INVENTOR
W. J. ALBERSHEIM
BY
G. H. Heydt.
ATTORNEY

Patented Apr. 16, 1935

1,998,064

UNITED STATES PATENT OFFICE 1,998,064

SOUND FILM RECORDING SYSTEM

Walter J. Albersheim, New York, N. Y., assignor to Electrical Research Products, Inc., New York, N. Y., a corporation of Delaware Application September 30, 1932, Serial No. 635,507
In Great Britain October 10, 1931

5 Claims. (Cl. 179—100.3)

This invention relates to sound film recording systems and more particularly to improvements in monitoring systems employed in such recording systems.

It is the main object of this invention to provide, in a sound film recording system, a monitoring arrangement in which the monitoring amplitude is greatly increased without producing either a decrease in the monitoring quality or distortion in the frequency characteristic of the sound recorded on the film.

A further object of the invention is to provide a means of monitoring the modulated light beam during its passage to the recording film without producing distortion in such projected beam.

A feature of the invention lies in the provision of a pair of flexed rectangular mirrors interposed in the modulated light beam to intercept and deflect separate portions of such beam to a monitoring photoelectric cell such mirrors being arranged to increase the definition of the image of the light valve slit on the recording film.

A further feature of the invention lies in the provision of a monitoring system in which means are provided for monitoring the operation of the light modulating device employed, such means also serving as a guide for effecting vital adjustments to such modulating device.

It has been the general practice heretofore to monitor the sound being recorded in a sound film recording system by means of a photoelectric cell placed behind the negative film on which sound is being recorded. This cell receives the modulated light after passage through said film. It has been found that, due to the distortion introduced by the moving film in its passage through the modulated beam, a system of this type does not provide a sufficiently true reproduction of the recorded sound within the limits required for efficient monitoring.

This invention has been developed more particularly for use with recording systems in which a modulated light beam is projected to a moving negative film in the form of a rectangle of constant length transversely of said film but of varying width longitudinally of said film. A modulating device developed for this purpose is disclosed in U. S. Patent 1,638,555 to E. C. Wente.

In accordance with this invention means are provided in the form of mirrors interposed in the modulated beam to deflect the upper and lower portions of said beam to a light sensitive device included in a reproducing circuit. The mirrors are in the form of flexed rectangular strips extending substantially parallel to the length of the light valve slit. The mirrors are spaced apart a distance sufficient to allow the passage to the film of modulated light necessary for efficient recording.

It has been the practice in many sound film recording systems of the type described to use a stop in the condenser lens system to restrict the effective aperture of this lens system in order to increase the definition of the image of the light valve slit and to produce uniform illumination across the width of the sound track. However, with the use of the system designed in accordance with this invention a stop in the condenser lens system may be eliminated as the mirrors themselves are so arranged that they deflect most of the light which would be cut off by such stops. The arrangement of the mirrors in accordance with this invention, therefore, produces an advantage in that the effective aperture of the condenser lens system may be increased without impairing the definition of the image of the light valve slit on the recording film.

Referring to the drawings.

Figure 4:
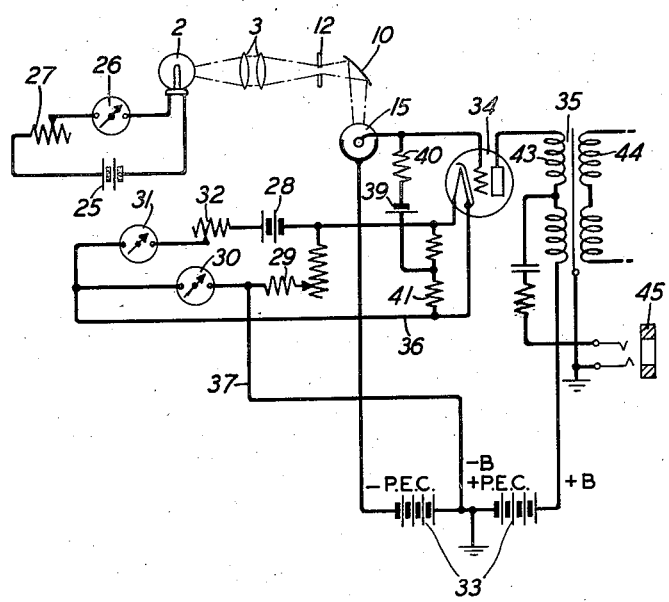

Fig. 4 discloses a reproducing circuit including the monitoring photoelectric cell to be employed with the monitoring device.

Figure 1:
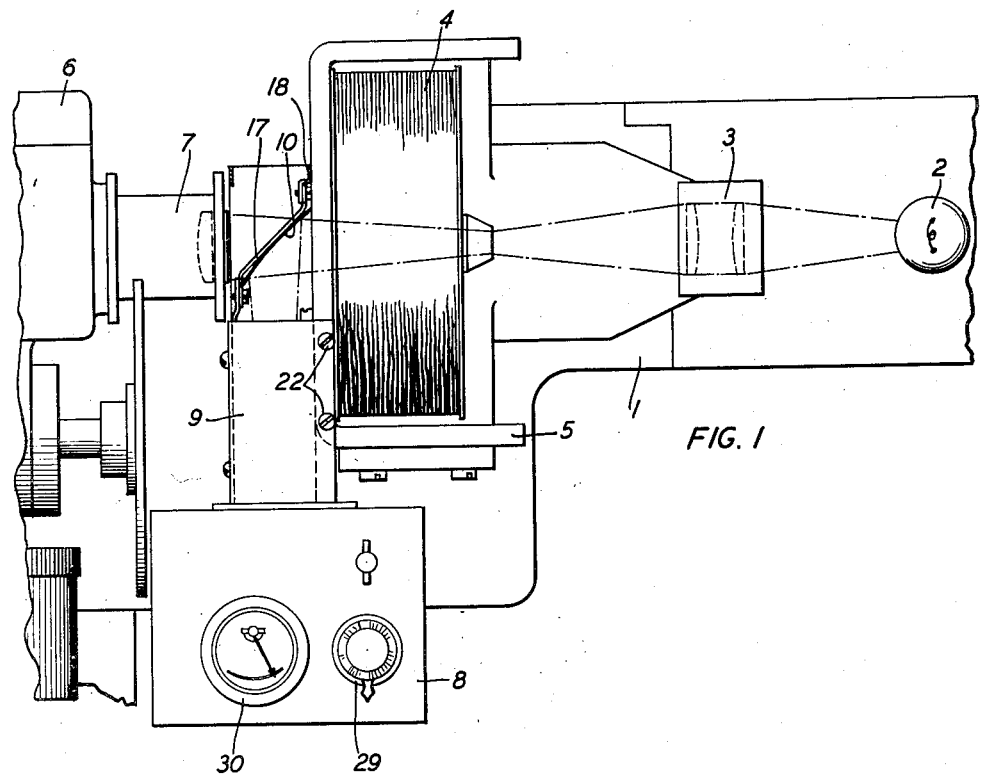
Fig. 1 is a plan view of a standard recording machine showing the position of the monitoring device attached thereto.

Referring to Fig. 1, a sound film recording machine base 1, has mounted thereon a light source 2, a condenser lens system 3 and a light valve 4 secured in a bracket supporting member 5. Numeral 6 indicates a compartment containing a driving mechanism for a negative photographic film F (Fig. 2) while 7 indicates a cylinder containing an objective lens system. A monitoring device is provided in the form of an attachment comprising a compartment 8 and an extended portion 9, the free end of which is inserted into the path of the light beam between the light valve 4 and the objective lens system 7. In the free end of extension 9 is supported a pair of flexed horizontal deflecting strips or mirrors, one of which is shown at 10.

Figure 2:
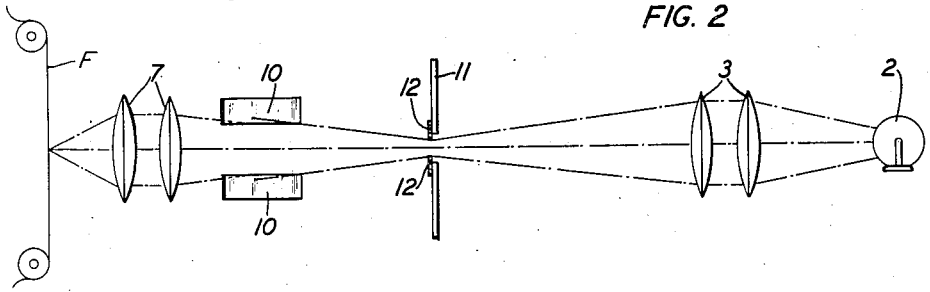
Fig. 2 is a diagrammatic showing of a sound recording optical system and the location of the deflecting mirrors in said system.

In Fig. 2 the optical recording system employed in the recording apparatus of Fig. 1 is shown diagrammatically. As shown in this figure, a modulating device comprises a member 11 containing a slit through which the light passes to the photographic film F. Numeral 12 indicates light valve ribbons which form a light transmitting slot and are movable toward and away from each other in response to sound modulated currents impressed thereon. It will be seen that the elongated deflecting mirrors 10 are arranged with their longer axis parallel to the length of the light valve slit, to deflect the upper and lower portions of the modulating beam emerging from the light valve. The mirrors 10 are preferably made of strips of polished chromium-plated tool steel and are preferably slightly flexed to concentrate the intercepted light on a photoelectric cell 15 (Fig. 3) mounted within the compartment 8.

Figure 3:
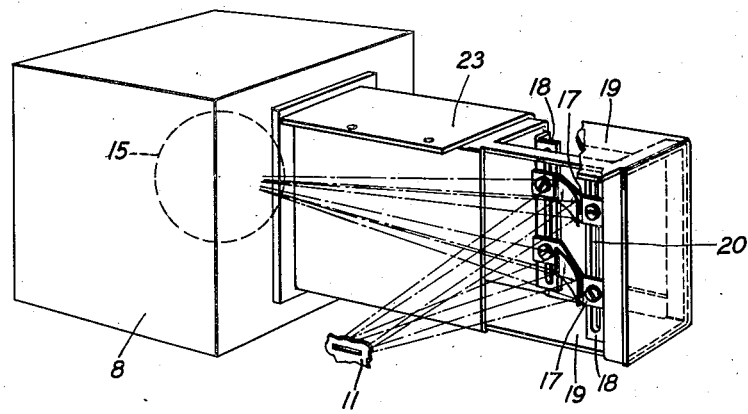
Fig. 3 is a view in perspective of the monitoring device showing the position of the light deflecting mirrors and the means for adjusting the position thereof.

Referring to Fig. 3, each mirror 10 is mounted on a supporting member 17 whose ends may be secured to members 18 by means of bolts or the like 19 extending through groove 20 in member 18. Each mirror may be separately adjusted vertically by loosening the bolts 19 and sliding the mirror supporting member 17 up or down to a desired position.

The dotted lines in this figure show the path of the modulated light beam emerging from the light valve slit 11 and also the path of the deflected portions of this beam which are deflected to the photoelectric cell 15 supported within the compartment 8. The center portion of the modulated beam passing between the mirrors is focussed by the objective lens system 7 as shown in Figs. 1 and 2 to a moving photographic film.

To produce a uniformly illuminated slit image on the record carrying film the inner edges of the mirrors should be arranged to cut down the beam passing to the objective lens to a substantially rectangular beam which will have an effective width equal to the diameter of the objective lens system. The amount of light transmitted to the film is thus practically the maximum compatible with good definition of the slit image thereon. With the arrangement of the mirrors as described there is produced an efficient definition of the light valve slit image on the film regardless of the removal of the stop ordinarily employed in the condenser lens system. The monitoring device is secured to the recording apparatus by means of screws 22 (Fig. 1) extending through flange portion 23 of the attachment and into the light valve supporting bracket 5.

In Fig. 4 is disclosed a monitoring reproducing circuit including the photoelectric cell 8. By means of this circuit the monitoring unit described may be made to perform a dual function. Not only may the quality of the modulation of the light beam be checked but also the quantity of the light passing through the valve may be checked and consequently the spacing or biasing of the movable elements 12 of the valve may be accurately gauged.

In this figure the lamp 2 is supplied with current from a battery 25 in circuit with an ammeter 26 and a resistance 27. The light deflected by mirrors 10 is directed to a photoelectric cell 15.

When the movable elements 12 are completely closed there will be no light on the cell 15. With no light on the cell 15 there is present a space current of vacuum tube 34 which flows from the plus B terminal of a battery supply source 33, primary winding of transformer 35, anode of tube 34, cathode of tube 34, conductor 36, meter 30, conductor 37 to the minus B terminal of battery 33. A potential supplied by a grid battery 39 through grid resistance 40 to the control electrode of tube 34 controls the magnitude of this space current. The deflection of meter 30 due to the space current flow is compensated by means of a current from filament battery 28 which flows through control resistance 29, milliameter 30, filament meter 31, variable resistance 32 to battery 28. This current flow may be adjusted by means of resistance 29, to an amount sufficient to offset the space current of tube 34 to bring the needle of meter 30 to a zero reading.

The battery 33 is preferably a 180 volt battery having its mid-point grounded and connected in the circuit to supply a plus 90 volt potential to the anode of tube 34 and minus 90 volt potential to the cathode of photoelectric cell 15.

In biasing the light valve ribbons, it is usual to apply a small alternating current to the ribbons and vary the direct current biasing current until the desired spacing is obtained. Therefore, when the light deflected from the mirrors 10 reaches the cell 15, the effective resistance of this cell is decreased and a current will flow from the mid-point terminal of battery 33 through wire 37, meter 30, wire 36, resistance 41, battery 39, resistance 40, anode of cell 15, cathode of cell 15 to the minus photoelectric cell terminal of battery 33. It will be seen that the direction of flow of this photoelectric cell current through the meter 30 is the same as the flow of the compensating current from battery 28 through resistance 29 which, as pointed out above, is opposite to the flow of the space current of tube 34. The needle of meter 30 will therefore, be deflected from its zero position by the flow of the photoelectric cell current. The space current of the tube 34, the path of which is outlined above, will oppose the flow of the combined currents from the photoelectric cell and the battery 28. However, with light on the cell 15 the space current of the tube 34 is decreased due to a change in potential across battery 39 and resistance 40 which in turn affects the bias of the control element of this tube to decrease the amount of the space current therein. Therefore, as the opposing space current of tube 34 through meter 30 is decreased simultaneously with an increase in the photoelectric cell current through the meter 30 in the opposite direction, the meter needle will give a deflection in the direction of flow of the latter current. As a result the meter 30 is deflected an amount corresponding to the average opening of the ribbons, which, up to the point of overload, will be the unmodulated spacing. The relation between the deflection of the meter needle and the biasing current of tube 34 will be linear until the point of ribbon clash or overload in the valve occurs.

If, during either the biasing operation or a recording operation of the valve, ribbon clash or overload should occur, there will be a change in the average illumination of the cell which will cause a sharp divergence from the linear in the response of the meter 30 to produce a sudden jump of the meter needle. By this means the operator may monitor the operation of the light valve 4 at all times during a recording operation.

During the recording operation varying current representing the sound being recorded will be impressed on the primary of transformer 35, the seconday 44 of which may be included in a circuit containing a monitoring loud speaker. Also, by means of a jack 45 connected, as shown, to the primary 43 of the transformer 35, headset monitoring may be provided.

What is claimed is:

1. The combination in a sound film recording system having means for projecting a beam of sound modulated light to a photographic film in the form of a rectangle of varying width longitudinally of said film and constant length transversely of said film, of means for deflecting a portion of said beam for monitoring purposes, said means comprising spaced rectangular mirrors interposed in said modulated beam to intercept and deflect the upper and lower portions of said beam, and a light sensitive device located in the path of said deflected beam.

2. The combination in a sound film recording system having means for projecting a beam of modulated light to a film in the form of a rectangle of varying width longitudinally of said film and constant length transversely of said film, means for deflecting a portion of said beam for monitoring purposes, said means comprising flexed horizontal mirrors interposed in separate portions of said modulated beam, and means for vertically adjusting said mirrors.

3. In a sound film recording system in which a modulated beam of light is projected from a modulating device to a photographic film in the form of a rectangle of varying width longitudinally of said film and constant length transversely of said film, in combination, monitoring means located between said modulating device and said film, said means comprising flexed rectangular mirrors interposed in different portions of said beam, and extending substantially parallel to the longer axis of said rectangular beam.

4. In combination, a sound film recording system, a source of light, means for modulating the beam projected from said source of light in accordance with sounds to be recorded, means for projecting said modulated beam to a moving photographic film, the modulated beam projected to said film being in the form of a rectangle of varying width longitudinally of said film and constant length transversely of the film, of means for monitoring the sound being recorded, said means comprising a pair of spaced rectangular mirrors interposed in opposite outer portions of said modulated beam, the longer axis of said mirrors being parallel to the longer axis of said light beam.

5. In a sound film recording system in which a modulated beam of light is projected from a modulating device to a photographic film in the form of a rectangle of varying width longitudinally of said film and constant length transversely of said film, in combination, monitoring means located between said modulating device and said film, said means comprising a light sensitive device, flexed rectangular mirrors interposed at different portions of said modulated rectangular light beam, and extending substantially parallel to the longer axis of said light beam, the curvature of said mirrors being such that the portions of said light beam deflected thereby are concentrated on said light sensitive device.

WALTER J. ALBERSHEIM.